Feb. 16, 1954 J. K. MOORE 2,669,135
MACHINE TOOL CONSTRUCTION
Filed May 13, 1953 4 Sheets-Sheet 2
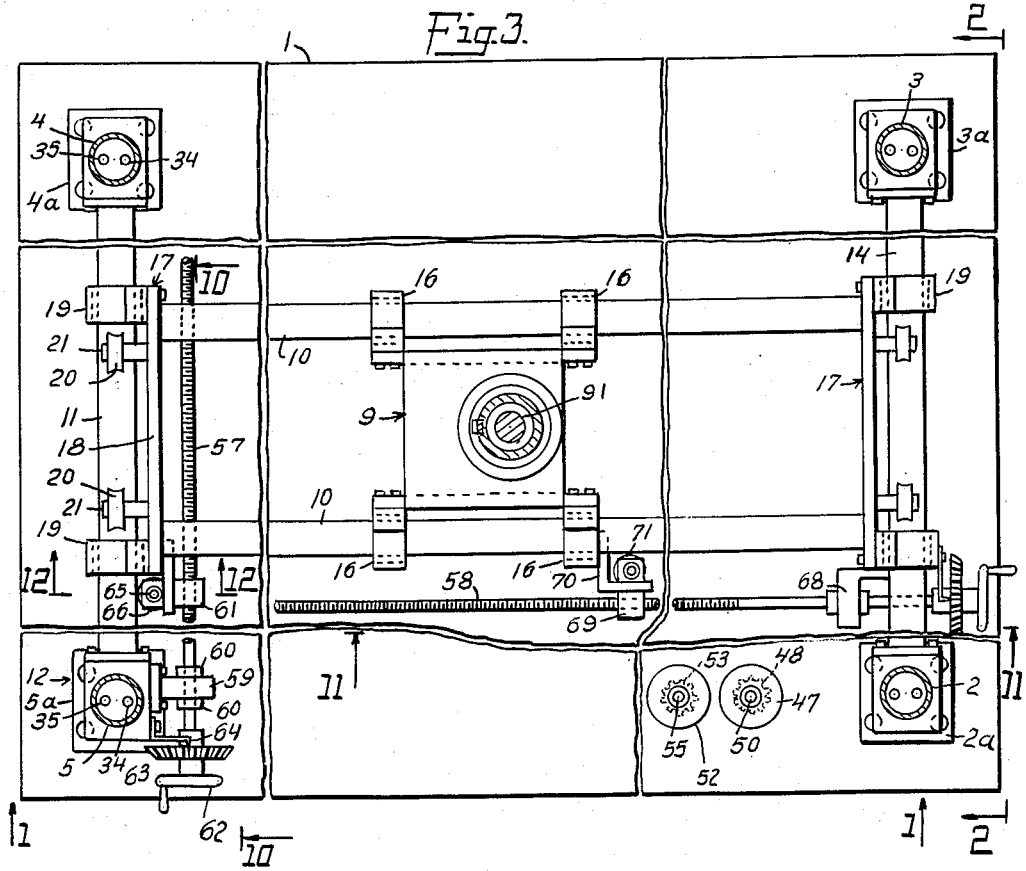
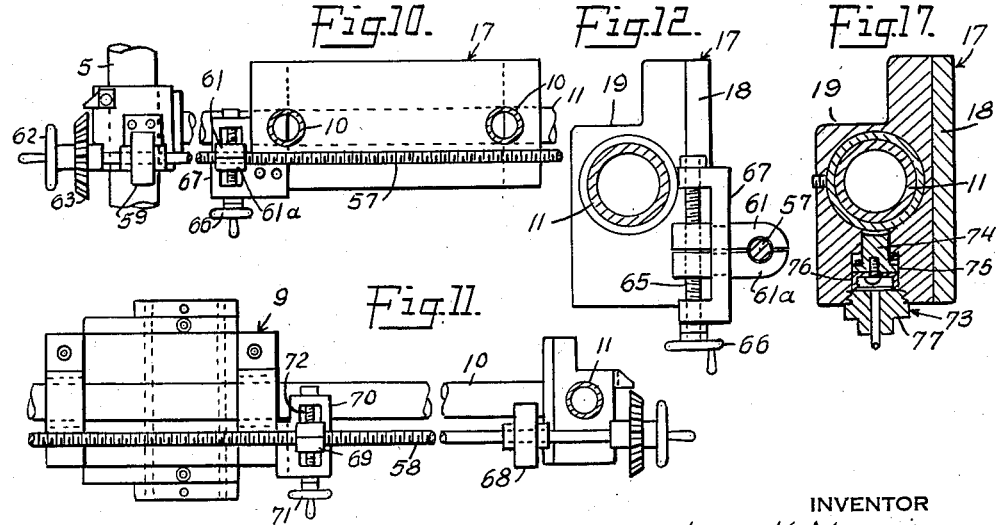
INVENTOR
JACK K. MOORE
BY
ATTORNEYS Feb. 16, 1954 J. K. MOORE 2,669,135
MACHINE TOOL CONSTRUCTION
Filed May 13, 1953 4 Sheets-Sheet 3

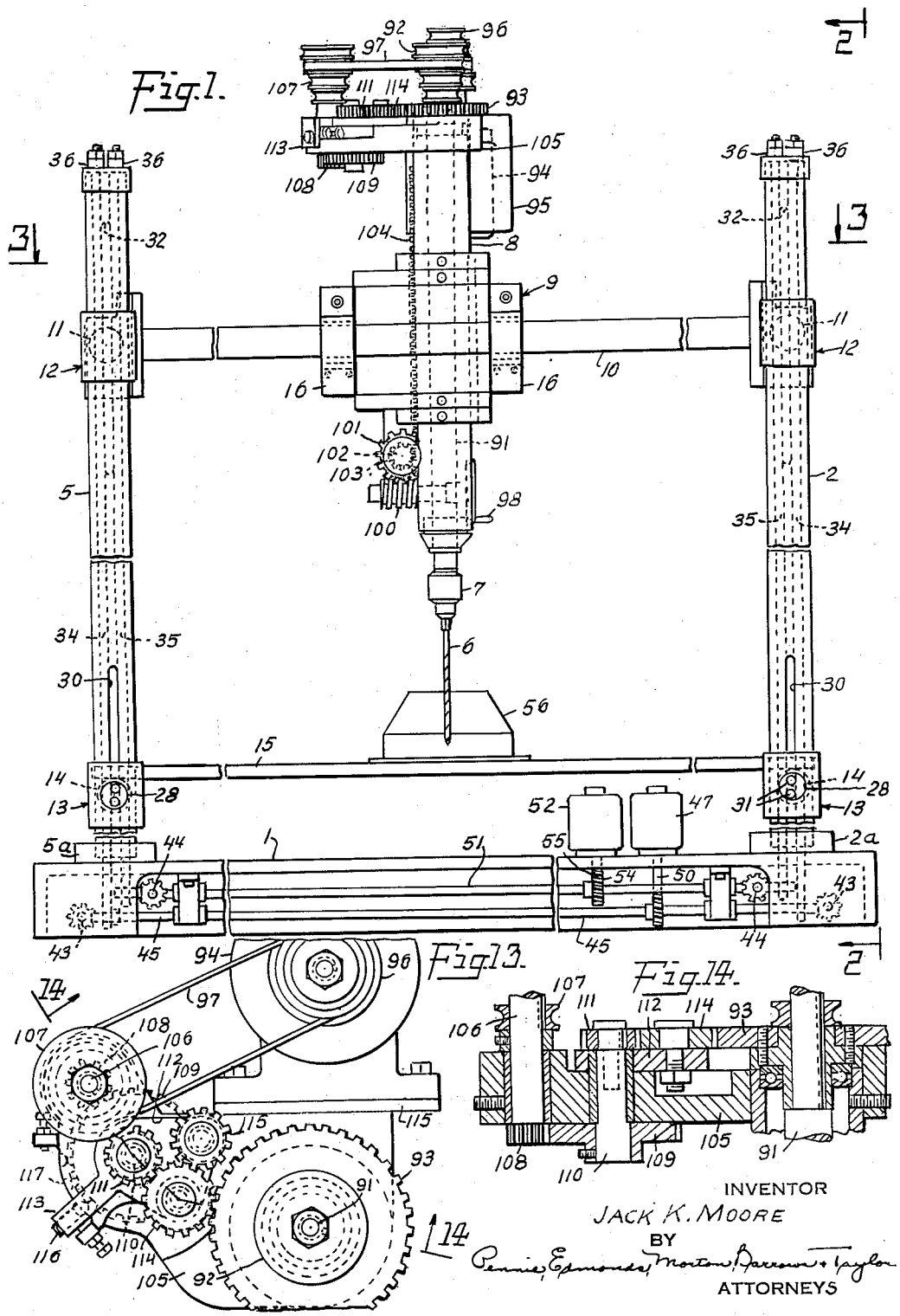

INVENTOR
JACK K. MOORE
BY
ATTORNEYS

Feb. 16, 1954   J. K. MOORE   2,669,135
MACHINE TOOL CONSTRUCTION
Filed May 13, 1953   4 Sheets-Sheet 4

INVENTOR
JACK K. MOORE
BY
ATTORNEYS

Patented Feb. 16, 1954

2,669,135

UNITED STATES PATENT OFFICE 2,669,135

MACHINE TOOL CONSTRUCTION

Jack K. Moore, Tucson, Ariz.

Application May 13, 1953, Serial No. 354,758

9 Claims. (Cl. 77—5)

This invention relates to the construction of machine tools, and its general purpose is to provide a machine tool which is capable of performing a wide variety of machining and woodworking operations. Thus the machine tool of the invention may be used for operations such as drilling, reaming, routing, tapping, milling, sawing, grinding, etc. The invention contemplates the provision of a machine tool of this sort which may be used, for example, for performing drilling, counterboring, reaming and similar operations, on various machine parts, such for example, as the oil pans of internal combustion engines, etc., and which will do such work with the required degree of precision and yet without involving a large capital outlay for tool expense.

One of the important objects of the invention is to provide a machine tool which is capable of performing such operations as enumerated above upon extremely large and cumbersome workpieces, as well as upon small parts.

Another object of the invention is to provide a machine tool which is so constructed that large and cumbersome parts may be placed in the machine and removed therefrom with ease.

A further object of the invention is to provide a machine tool which is capable of quick adjustment to accommodate successive workpieces differing greatly in their dimensions.

A still further object of the invention is to provide a machine tool which will accommodate a plurality of workpieces and a plurality of operating heads performing either the same or different operations upon the respective workpieces either by moving the operating heads to the several workpieces, or by moving each workpiece along the work-supporting table without removing it from the table until the final operation is completed.

Still another object of the invention is to provide a machine tool which may be operated as a pantograph machine, wherein a tool, such for example as an end milling cutter, or router bit, may be guided in its contact with the workpiece according to a template, so that the outline of the template will be reproduced in the work.

One of the advantages of the improved machine tool when used for drilling with a jig is the ease with which the drill can be shifted to its proper location as dictated by the jig.

The improved machine tool will be described in connection with its use as a drilling machine as illustrated in the accompanying drawings.

Referring to these drawings:

Fig. 1 is a view in end elevation, as indicated by the arrows 1—1 of Figs. 2 and 3, of the improved machine tool used as a vertical drilling machine;

Fig. 2 is a similar view in side elevation as indicated by the arrows 2—2 of Figs. 1 and 3;

Fig. 3 is a plan view of the machine with the work-supporting table or platform omitted;

Fig. 5 is an enlarged vertical section with parts broken away taken on broken line 5—5 of Fig. 2;

Fig. 6 is a detail transverse section taken on line 6—6 of Fig. 2 and drawn to the same scale as Fig. 5;

Fig. 7 is a vertical section taken on line 7—7 of Fig. 6;

Fig. 8 is a detail transverse section similar to Fig. 6 but taken on line 8—8 of Fig. 2;

Fig. 9 is an enlarged horizontal section taken on line 14—14 of Fig. 2;

Fig. 10 is a detail vertical section taken on line 10—10 of Fig. 3;

Fig. 11 is a similar section taken on line 11—11 of Fig. 3;

Fig. 12 is a vertical section taken on line 12—12 of Fig. 3;

Fig. 13 is a plan view of the back gear mechanism shown at the upper part of Fig. 1 but drawn to an enlarged scale;

Fig. 14 is a vertical section taken on broken line 13—13 of Fig. 12;

Fig. 17 is an enlarged vertical section taken on line 17—17 of Fig. 15.

Figure 4:
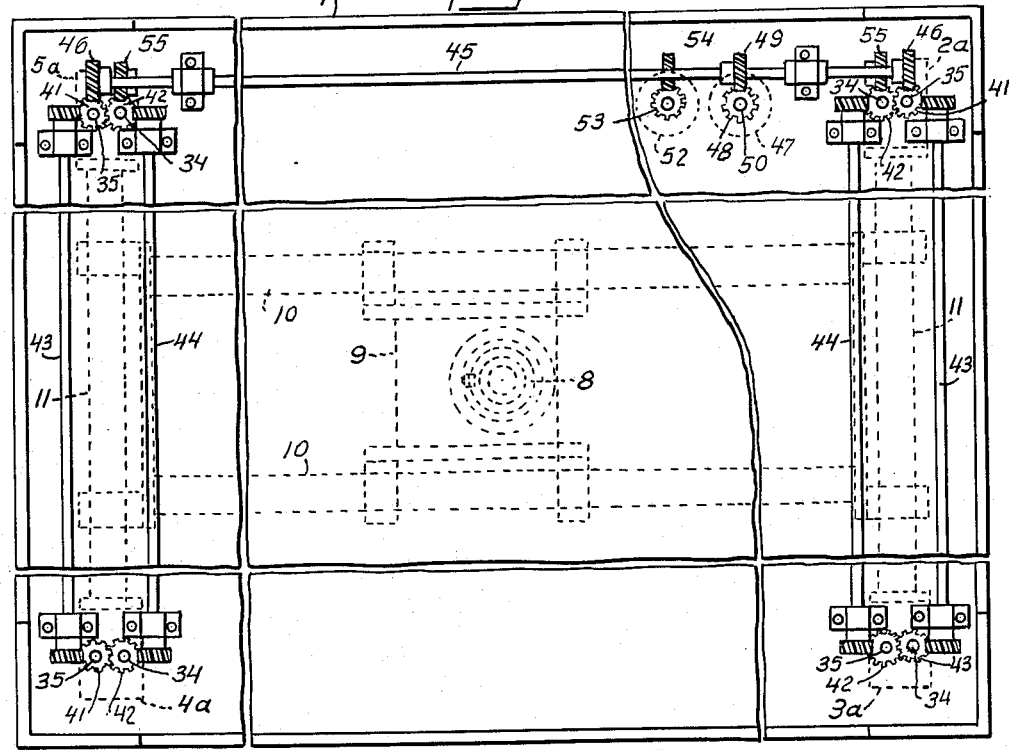
Fig. 4 is a view of the bottom of the base of Fig. 1 looking upward.

Referring now to the accompanying drawings, the machine comprises a base 1 which may be made either of an appropriate metal casting or built up of steel plates; as shown, it is in the form of a casting. This base is of suitable dimensions and shape to support the machine for which it is intended. Ordinarily it will be rectangular or square in horizontal plan and, for example, may be four or more feet in width and ten or more feet in length. Near each corner of the base is an upright post, the front side posts being indicated by reference numerals 2 and 3 and the rear posts by 4 and 5. These posts are securely fixed in bosses 2a, 3a, 4a and 5a on base 1. They are advantageously hollow tubular members, but may have an H-shape or other cross-section.

Supported between the front posts 2 and 3 and the rear posts 4 and 5, respectively, there are two parallel tool carriage and mounting supporting bars 11. Below these there are two parallel work-table supporting bars 14. Extending crosswise between the upper two parallel bars 11 is a pair of cross bars 10 on which a tool mounting 9 is slidably supported. Cross bars 10 preferably extend the narrow dimension of the machine tool and bars 11 the lengthwise or longer dimension.

The tool, in this instance a drill, is mounted in a chuck 7 fixed to the lower end of a shaft which rotates in a column 8 which is vertically movable in the tool mounting 9.

The ends of supporting bars 11 are attached to supporting members 12 which are vertically slidable on the respective posts 2, 3, 4 and 5, and mechanism is provided for simultaneously shifting the supporting members on the posts while maintaining the bars 11 in horizontal position, and thus, through the cross bars 10 and the tool mounting 9 raising and lowering the tool carrying column 8.

Mounted on the posts 2-5 below the bar-supporting members 12 there is a second set of bar-supporting members 13, one for each of the four posts. These members on the front posts 2 and 3 have attached thereto the front work table supporting bar 14, and the members on the two rear posts 4 and 5 the rear bar 14 (not visible). This work-table, indicated at 15, may be either a thick steel plate (or series of plates side by side), or a metal casting, ribbed on the underside as required to provide the necessary rigidity for the type of work to be done.

Mechanisms for simultaneously raising and lowering the lower bar-supporting members 13 are so arranged as to simultaneously move these four members on their respective posts to raise and lower the two work-table bars 14 and to maintain them both in the same horizontal plane parallel with the plane of the upper horizontal tool carrying bars 11. These mechanisms are independent of each other so that either the work-table 15 may be raised or lowered, or the tool mounting 9 may be raised or lowered, as desired.

The tool mounting 9 may either by a steel casting, or built up of steel plates secured together in any suitable manner. As shown in Fig. 3 it is provided with four bosses 16 having apertures to receive the cross bars 10, and also provided with locking mechanism, to be later described, for locking the tool mounting in any desired position on the cross bars. The apertures for bars 10 are bushed, preferably with nylon bushings, to make sliding fit with the cross bars 10 which will permit the tool mounting to be readily moved by hand to any desired position. These bushings fit sufficiently close to substantially prohibit any vertical movement, or rocking movement, with respect to bars 10.

It will be understood that cross bars 10 have finished surfaces in order to provide the required accurate fit within the bushed apertures of the bosses 16. These bars may be made of solid steel, but preferably are made of heavy steel tubing in order to reduce weight and at the same time provide the necessary rigidity. Cross bars 10 are supported at their opposite ends on carriages indicated generally by numeral 17. These carriages are alike, and each comprises a vertical steel plate 18 having lugs 19 which project horizontally near its ends to form sliding bearings with one of the upper supporting bars 11.

Grooved wheels 20 are rotatably mounted on stud shafts 21 which project horizontally from the outer surface of carriage plate 18. These wheels are arranged both above and below the supporting bars 11. The vertical spacing of these wheels 20 with respect to the apertures in the lugs 19 is such that the wheels 20 receive the weight of the cross bars 10, and the parts supported thereon, while the apertures in lugs 19 serve to prevent the distortion or shifting of the wheels 20 on their supporting shafts under the stresses applied when the tool 6 is fed downwardly into the work. In this way the wheels 20 serve to ease the friction load when the cross bars 10 and tool mounting 9 are shifted lengthwise of the machine.

It will be understood that in certain sizes of the improved machine tool and for operation on certain classes of work it may be desirable to eliminate the wheels 20 and depend on the closely fitting bearing lugs 19. These lugs may be provided with bearing bushings similar to the bosses 16 of the tool mounting 9. It will also be understood that under certain conditions, particularly with the larger sizes of the machine tool, it may be desirable to provide the grooved wheels 20, or their equivalent, on the tool mounting 9, in association with the plain, sliding bearings of bosses 16, in order to reduce the friction in shifting the position of the tool mounting along the cross bars 10.

The bar supporting members 12 and 13 for the respective upper and lower pairs of horizontal bars 11 and 14 are nearly but not quite identical. A description of the bar-supporting members 13 for the lower or work-table supporting bars 14 will be given first. Referring to Fig. 6, each of these bar-supporting members 13 comprises two members which slide on the surfaces of its hollow post; outer sleeve 22 and an inner block or nut member 23. The outer sleeve 22 has a bore which fits the outer surface of the post but is preferably square or rectangular in outer configuration. The adjacent end of one of the bars 14, these bars being in the form of thick walled tubes is secured to sleeve 22 by means of a member 25. This member is secured to a flat face 24 by means of screws 26 (Fig. 7). Member 25 has a central projection 27 which enters the outer end of the hollow bar.

The inner member, block 23, is permanently connected with the outer member, sleeve 22, by means of a disk having a circular head which fits closely within a lateral opening in the side of sleeve 22. This member 28 has on its inner surface a rib or projection 29 which extends through a lower vertical slot 30, provided in each of the four posts 2-5, and engages one side of the nut member 23, which is slabbed to provide a flat surface. These parts are held in fixed relation to one another by means of a pair of screws 31 (Fig. 7). The slots 30 extend from near the bottom of the posts upwardly to provide the range of raising and lowering movement desired for the work-supporting table 15.

Referring now to Fig. 8, as stated above, the construction of the upper supporting members 12 is similar to that of members 13 just described. The differences in construction of the two supporting members are occasioned by the fact that the slots 30 are on the outsides of the respective four posts 2-5, whereas the slots 32 which are provided in the upper portions of these posts to afford the desired range of raising and lowering movement of the tool mounting 9, are disposed 180° on the insides of the posts. Consequently, slots 32 are positioned adjacent the ends of the upper or cross bars 10. Therefore, the disk member 28a which serves to interconnect the inner or nut member 23 of each of the mountings 12 with its outer or sleeve member 22a is inside the attaching member 25a, by which the end of bar 10 is attached to the supporting member. The recess 33 for receiving disk member 28a is necessarily somewhat deeper than the recess for disk 28 of the supporting member 13.

In order to impart the raising and lowering movement of the respective bar-supporting members 12 and 13, just described, each of the four posts 2–5 is provided with two jackscrews 34 and 35. These are elongated threaded rods and extend from the top to the bottom of the posts. Each rod is provided with a ball thrust bearing 36 at the top and with sleeve bearings near the bottom. These jackscrews pass through apertures which are provided in both the inner or nut members of the respective bar-supporting members 13 and 12, respectively.

One of the apertures in each of these nut members is threaded and the other is not; thus the jackscrews 34 which operate the work-table supporting member 13 of each post, is unthreaded at its upper portion and passes through an unthreaded aperture in the upper nut member 23a, and the lower portion of this screw 34 is threaded as shown at 38, and coacts with the threaded aperture 39 in the lower nut member 23. Conversely the jackscrew 35 which operates the tool mounting supporting bars 11, is threaded at its upper portion as shown at 40 in Fig. 5, and this portion is in threaded engagement with the aperture 39a in the nut member 23a. The lower portion of jackscrew 35 is not threaded and merely rotates in the unthreaded apertures 37a in the lower nut member 23.

The mechanism shown for simultaneously rotating the two sets of jackscrews 34, 35, one in each of the posts 2–5 respectively, is shown in Figs. 1 and 4. Mounted on the lower ends of each of the jackscrews 34 is a helical gear 41, and mounted on the lower ends of each of the jackscrews 35 is a helical gear 42, the screws 34 being somewhat longer than screws 35 so as to place the gears 41 below gears 42, as shown in Fig. 5. At each side of the machine tool in the lower portion of the base 1 there are two parallel shafts 43 and 44 which are mounted for rotation in suitable bearings.

Shaft 43 serves to interconnect the two jackscrews 34 through helical gears on its opposite ends which mesh with and are of the same diameter and pitch as gears 41.

Shaft 44 serves to similarly interconnect the jackscrews 35. This arrangement being duplicated on the opposite sides of the base, the two jackscrews 34 in posts 2 and 3 are interconnected with one another so that they will rotate in unison, and the two jackscrews 35 within these same posts are similarly interconnected. Also, the corresponding jackscrews 34 in posts 4 and 5 are interconnected in the same manner, as well as the jackscrews 35 in these two posts.

In order to simultaneously drive or impart rotation to the four jackscrews 34, for raising or lowering the work-table 15, a drive shaft 45 (Figs. 1 and 4) is arranged across one end of the base 1. This shaft has helical gears 46, one at each end, to mesh with helical gears 41 on the lower ends of the two jackscrews 34 at this end of the machine. An electric motor 47 mounted in vertical position at this end of the base has a helical gear 48 on its shaft 50 which meshes with a similar gear 49 on drive shaft 45. The gear 41 on the lower end of vertical jackscrew 34 at each side of the machine base serves as a common drive member interconnecting gear 46 on drive shaft 45 with the helical gear on the adjacent end of the horizontal shaft 43. Consequently all four of the jackscrews 34 for raising and lowering the work-table 15 are interconnected and simultaneously operated by the rotation of motor shaft 50.

The operating connections for simultaneously rotating the four jackscrews 35 for raising and lowering the tool mounting supporting bars 10 are identical with the mechanism just described for driving the four jackscrews 34. To this end a second drive shaft 51 is mounted parallel with drive shaft 45 and slightly above it as shown at Fig. 1. Drive shaft 51 is operated by a second electric motor 52, the motor shaft 53 being connected thereto by helical gearing 54. The two parallel side shafts 44 have helical gears at their respective ends meshing with the helical gears 42 on the lower ends of the two pairs of jackscrews 35. Gears 55 on the opposite ends of drive shaft 51 drive the gears 42 on the adjacent jackscrews 35, and through these gears drive the side shafts 44.

With this arrangement it will be understood that by operating the driving motors 47 and 52 through appropriate control mechanism (not shown), the work-table 15 may be raised or lowered as desired, and independently of this operation, the tool mounting 9 may also be raised and lowered as desired, in order to bring the tool, such as the drill 6, into and out of operative relation to the workpiece, such for example as the internal combustion engine oil pan shown at 56 in Figs. 1 and 2. It will also be understood that if desired, hand cranks (not shown) may be applied to the upper ends of the motor shafts 50 and 53, or otherwise, so as to adjust the positions of the tool and worktable by hand. In machine tools of the smaller sizes such manual adjustment may be used entirely, and the electric driving motors 47 and 52 eliminated.

Referring now to Fig. 3, it was mentioned that the tool mounting 9 may be moved by hand to the desired position on the cross bars 10 and that the tool mounting may be moved at right angles to this direction by shifting the position of cross bars 10 and carriages 17 along the tool mounting supporting bars 11. However, if desired, manually operated lead screws 57 and 58 may be provided for this purpose and in order to obtain more precise location and adjustment of the tool with respect to the work. Lead screw 57 is mounted for rotation in a bracket 59 mounted on one of the bar-supporting members 12, for example the one of these members which is arranged at the upper portion of post 5.

Collars 60 are fixed to the lead screw on opposite sides of bracket 59 to prevent longitudinal movement of the screw and the threaded portion of the screw cooperates with a nut made in separable sections 61, 61a (Fig. 12) and mounted on the carriage 17 which supports the adjacent ends of cross bars 10. The separable halves or sections 61, 61a may be moved into and out of engagement with the lead screw 57 in any suitable manner so as to permit the manual shifting of cross bars 10 to the approximate position desired on the supporting bars 11. Then the final position can be obtained by engaging the nut sections with the lead screw and turning the lead screw by means of a hand wheel 62 which is mounted at the outside end.

The lead screw is also preferably provided with a dial 63 and stationary pointer 64, the dial being marked off in suitable divisions to aid in setting the location of the tool lengthwise of bars 11. The mechanism shown in Fig. 12 for operating the separable sections 61, 61a of the nut comprises a double-threaded screw 65 with the portions at its opposite ends oppositely threaded so that by turning a hand wheel 66 the nut sections may be caused to move in their supporting bracket 67 to grasp or release the screw 57.

The construction and arrangement of lead screw 58 are similar to that just described. This lead screw has a bearing in a bracket 68 which is mounted on one of the carriages 17, for example the one which is at the opposite end of cross bars 10 from jackscrew 57. The lead screw 58 engages a separable nut 69, the sections of which are mounted on a bracket 70 attached to tool mounting 9. A hand wheel 71 rotates the double-threaded screw 72 and brings the two sections of nut 69 into or out of engagement with the lead screw 58.

Under certain circumstances it may be desirable to lock the tool in position after it has been properly adjusted with respect to the workpiece 56. To do this it is necessary to lock tool mounting 9 to cross bars 10, and also to lock both of the carriages 17 to the longitudinal or tool carriage supporting bars 11. This locking can be accomplished conveniently by the use of a mechanism which is operated by air or other fluid pressure. One of these locking devices, indicated generally by numeral 73, is illustrated in Fig. 17 and is mounted in each of lugs 19 of the carriages 17.

Each device consists of a plunger 74 which is movable vertically in an aperture in the lower portion of lug 19, such aperture being counterbored as to form an air cylinder 75. A piston 76 moving in cylinder 75 is attached to the lower end of plunger 74. A plug connection 77 for an air conduit or tube is screwed into the lower end of cylinder 75. When the air pressure is applied plunger 74 which preferably has an arcuate face, is forced against the lower surface of bar 11 and effectively locks the carriage 17. An air locking device 78 constructed similarly to device 73, just described, is provided in the lower portion of each of the bosses 16 of the tool mounting 9.

Figure 16:
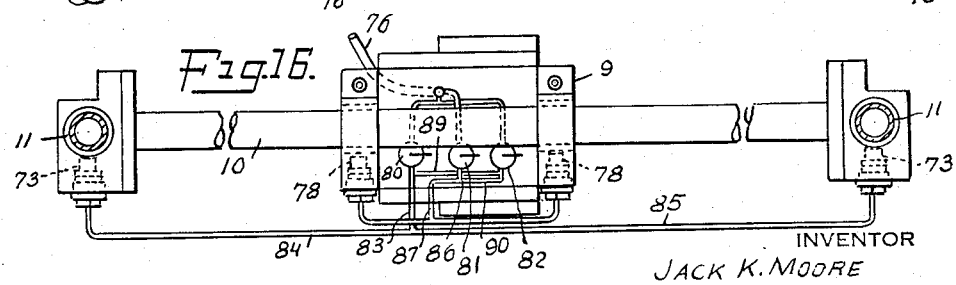
Fig. 16 is a sectional elevation of the parts shown in Fig. 15.

Air for operating the locking devices 73 and 78 is supplied through a flexible hose 79 (Fig. 16) to three control valves 80, 81 and 82. Each of these valves has three positions. In the horizontal position the air is cut off; in the vertical position the air is turned on, and in a midway position the air supply is closed off and a vent is opened from the conduits to which the valves are connected.

Figure 15:
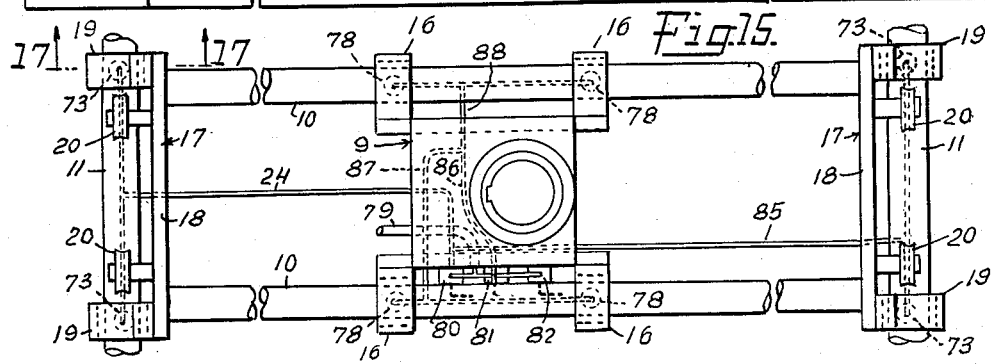
Fig. 15 is a partial plan view similar to Fig. 3 with parts omitted and illustrating the air pressure locking mechanism.

These conduits from valve 80 are indicated at 83, 84 and 85 which lead to the four air locking devices 73, two on each carriage 17. Central control valve 81 is arranged to control the air locking devices 78 of the tool mounting 9, and for this purpose a conduit 86 connects valve 81 with two branch pipes 87 and 88. Conduit 87 branches to the two air locks 78 at the front of the tool mounting as viewed in Fig. 15, and conduit 88 leads to the two locking devices at the rear.

From the above it will be understood that valve 80 may be used to lock the two carriages 17 at any position on the tool carriage supporting bars 11, and that valve 81 may be used to lock the tool mounting 9 at any position on its supporting bars 10; also, that the tool carriages 17 may be locked while the tool mounting 9 is left unlocked, or vice versa.

The third control valve 82 is provided to enable the tool mounting 9 and the carriages 17 to be locked and unlocked simultaneously and quickly. Accordingly, a conduit leads from the outlet of valve 82 to the outlet of valve 80, that is, conduit 83. Also, a tube 90 leads from the outlet of valve 82 to the outlet of valve 81, in other words conduit 86. With this arrangement, by leaving both valves 80 and 81 in their closed position, valve 82 will control the application of air pressure to all of the air locks simultaneously, and also the venting of all of these air locks to the atmosphere simultaneously.

Referring now to the construction of the tool carrying column 8, this comprises an elongated sleeve or tubular member which is arranged to slide in a suitable vertical aperture extending from top to bottom of the tool mounting 9. Within this sleeve there is a vertical driving shaft or spindle 91 on the lower end of which the chuck 7, or other device for supporting the desired tool, is attached. Shaft 91 is provided with the usual ball thrust bearings as illustrated in Figs. 1 and 2.

Power is applied to spindle 91 at its upper end in either of two ways, namely, by means of a stepped pulley 92 or by means of a spur gear 93. This power may be obtained from any suitable source, but preferably an electric motor 94 is mounted in vertical position on a bracket 95 attached to one side of the upper end of tool carrying column 8. The vertical shaft of motor 94 which extends upwardly is provided with a second stepped pulley 96, and belt 97 serves to interconnect this pulley with pulley 92 in a conventional manner.

When the drill 6, or other tool, is to be operated at fairly high rotative speeds, a suitable range of these speeds may be obtained by shifting the belt 97 on the stepped pulleys, as is well understood. When, however, lower speeds are to be used, a back gear driving mechanism, shown in Figs. 13 and 14, may be employed. In this event, the belt 97 is removed from pulley 92 and applied to the back gear mechanism. The output of the back gear mechanism drives the spindle 91 through spur gear 93. This mechanism will be described in detail presently.

The drill 6, or other tool, may be raised or lowered with respect to the work 56 in either of three ways. The first of these is by means of a hand wheel 98 which may be used to run the tool carrying column 8 up and down with reference to tool mounting 9. For this purpose hand wheel 98 is mounted on a short horizontal shaft 99 on the rear end of which there is a worm 100 which engages a worm gear 101, this worm gear being fixed to a short horizontal cross shaft 102. A small pinion 103 on shaft 102 meshes with the teeth of a rack 104 which is secured to the side of column 8.

The second manner of raising and lowering the tool 6 with respect to the work 56 is by operating the jackscrews 35 raising or lowering the tool carriage supporting bars 11. The third way is by operating jackscrews 34 to raise or lower the work-table supporting bars 14. This is done by operating the respective driving motors 47 and 52, or by turning their respective shafts 50 and 53 by means of the hand crank (not shown)

and as previously mentioned. Any of these three methods of changing the position of the tool with respect to the workpiece can be used or, by using a combination of the methods, the tool 6 can first be brought into contact with the work by turning handle 98 and lowering column 8, and then the feeding of the tool into the work may be accomplished either by lowering supporting bars 11 for the tool carriage and mounting, or by raising the supporting bars 14 for the work-table 15.

Referring now to the back gear mechanism referred to in Figs. 13 and 14, this comprises a bracket 105 which projects laterally from the top of tool supporting column 8. Near the outer end of this bracket is a bearing for an upright shaft 106. On the upper end of this shaft is a third stepped pulley 107, and on the lower end of it there is a pinion 108 which meshes with a large gear 109 keyed to a short vertical shaft 110. On the upper end of shaft 110 there is a pinion 111. Mounted for rocking movement on this same shaft 110, and below pinion 111, there is a gear supporting plate 112 having an arm or actuating handle 113 which serves as a means for reversing the direction of rotation of the tool spindle 91. To this end there is mounted for rotation on plate 112 an idler gear 114, and a reversing gear 115. Pinion 111 is constantly in mesh with idler 114 and reversing gear 115 with idler 114. In the position shown in Fig. 13 idler gear 114 is in mesh with driving gear 93 on the tool spindle 91, and this shaft is therefore driven in one direction of rotation, let us say clockwise.

However, by shifting arm 113 from the position shown to an upper position adjacent the upper stop screw of Fig. 13, gear 114 is withdrawn from meshing engagement with gear 93 and reversing gear 115 is brought into meshing engagement therewith, thereby reversing the direction of rotation of spindle 91. Arm 113 is provided with a spring and ball positioning mechanism, indicated by reference numeral 116, which is constructed to hold the arm in either of the two extreme positions, or in a central position indicated by numeral 117. This is a neutral position in which both gears 114 and 115 are out of mesh with gear 93. In this position the driving belt 97 is operated between stepped pulleys 96 and 92. When it is desired to use the back gear mechanism it will be understood that belt 97 will be removed from stepped pulley 92 and placed upon stepped pulley 107.

It will be understood that the work-table 15 is provided with the usual slots for the reception of the conventional T-headed bolts for holding the work on the table. It was mentioned previously that various tools can be used in place of the drill 6, for example, a reamer, a tap for cutting threads, a routing bit, milling cutter, saw, etc. When using the reamer for finishing holes previously drilled the feeding of the tool into the work by operation of the jackscrews 34 or 35, as previously described, is particularly effective.

When a routing bit is placed in the chuck in place of the drill 6, the air locks 73 and 78 are usually all released so that the tool mounting 9 can be moved by hand to cause the tool to follow the desired pattern. If desired, a template can be mounted above the machine tool, with its supports (not shown) attached to the posts 2-5. Then a following finger or roller may be mounted on an extension from the head of column 8, and by maintaining this finger in contact with the outline of the template, the routing tool may be caused to duplicate this template outline in the work on the work-table.

When using a milling cutter or a saw, the tool itself may be provided with a support including bevel gears so that the milling cutter or saw will rotate on a horizontal instead of a vertical axis but will be rotated from the driving shaft 91. It will be understood, however, that the milling cutter can be operated in the vertical position by attachment to the lower end of the spindle 91. The machine tool is especially convenient to use in connection with a milling operation inasmuch as the work-table 15 and the lower end of the spindle 91 can be brought extremely close together, which is not convenient in the ordinary milling machine.

With the usual tapping operations the tap is self-feeding. The tap is rotated at slow speed and consequently the back gear mechanism is used. The tap is allowed to feed itself into the work until the desired depth has been reached, and then the reversing arm of control lever 113 of the back gear mechanism is shifted as above described to reverse the direction of the tap and cause it to feed out of the work. Because of the construction of the back gear mechanism the reversal is accomplished without clashing of the gears, inasmuch as both gears 114 and 115 tend to pull themselves into mesh with the gear 93 as soon as one or the other of these gears is brought into contact with the driven gear 93.

By means of the present invention a machine tool has been devised which is extremely versatile and can be used for a large number of different operations. Some of these have been mentioned above, but there are numerous other uses to which the improved machine tool can be put. It will be understood that various changes may be made in the construction and arrangement of the tool to suit different conditions without departing from the spirit of the invention, the scope of which is set forth in the appended claims.

I claim:

1. A machine tool construction comprising, a base member having four upright parallel posts mounted thereon one adjacent each corner, a pair of horizontal bars extending respectively between the posts on the opposite sides of said base, a mounting member arranged for sliding movement on each of said posts, said mounting members being connected to the ends of said horizontal bars to support them, jack means associated with each of said posts for shifting said mounting members vertically along the post, and mechanism for simultaneously operating said jack means to raise and lower said bars and maintain them in the same horizontal plane.

2. A machine tool construction comprising, a base member having four upright parallel posts mounted thereon one adjacent each corner, upper tool mounting supporting bars and lower work-table supporting bars extending between the posts on the opposite sides of said base, upper and lower bar supporting members arranged for sliding movement on each of said posts, said upper members being connected to the opposite ends of said upper bars, and said lower members being connected to the opposite ends of said lower bars, a first jack means associated with each of said posts for shifting the lower supporting member vertically along the post, a second jack means associated with each post for shifting the upper supporting member vertically along the post, and two independent mechanisms for simultaneously rotating said first jack means and said second jack means respectively, of said four posts, one of said mechanisms raising and lowering the said lower bars and maintaining them in the same horizontal plane and the other of said mechanisms raising and lowering the said upper bars and maintaining them in the same horizontal plane parallel with the plane of the lower bars.

3. A machine tool construction comprising, a base member having four upright parallel hollow posts mounted thereon one adjacent each corner, each of said posts having a jackscrew and a coacting nut member arranged respectively for rotating and sliding movements within the post and a collar arranged to slide on the exterior of the post and rigidly connected with the nut member through a slot in the wall of the post, a pair of horizontal bars on opposite sides of said base, each of said bars being supported at its opposite ends by one of said collar members, and mechanism for simultaneously rotating said jackscrews to raise or lower said bars and maintain them in the same horizontal plane.

4. A machine tool construction comprising, a base member having four upright parallel posts mounted thereon one adjacent each corner, a pair of post-carried bars extending respectively between the posts on the opposite sides of said base, a mounting member arranged for sliding movement on each of said posts, said mounting member being connected with the ends of said post-carried bars to support them, jack means associated with each of said posts for shifting said mounting member vertically along the post, mechanism for simultaneously operating said jack means to raise and lower said bars and maintain them in the same horizontal plane, a pair of cross bars extending between and adjustable on said post-carried bars, and a tool mounting arranged for adjusting movement on said cross bars.

5. A machine tool construction as set forth in claim 4 in which a tool carrying spindle is arranged for vertical adjustment in the tool mounting.

6. A machine tool construction as set forth in claim 5 wherein a speed reducing and reversing gear mechanism is carried on the tool mounting to drive and reverse the tool carrying spindle.

7. A machine tool construction comprising, a rectangular base member having four upright parallel posts mounted thereon one adjacent each corner, a pair of post-carried bars extending respectively between the posts on the opposite sides of said base, a mounting member arranged for sliding movement on each of said posts, said mounting member being connected with the ends of said post-carried bars to support them, jack means associated with each of said posts for shifting said mounting member vertically along the post, mechanism for simultaneously operating said jack means to raise and lower said bars and maintain them in the same horizontal plane, a pair of cross bars extending between and adjustable on said post-carried bars, a tool mounting arranged for adjusting movement on said cross bars, locking means for locking the cross bars on the post-carried bars, and separate locking means for locking the tool mounting on the cross bars.

8. A machine tool construction as set forth in claim 7 wherein each of the locking means comprises an air operated plunger, a control valve for controlling the air supply to the air operated plungers mounted on the cross bars and acting on the post-carried bars, and a second control valve for controlling the air operated plungers mounted on the tool mounting and acting on the cross bars.

9. A machine tool construction comprising, a rectangular base member having four upright parallel posts mounted thereon one adjacent each corner, a pair of post-carried bars extending respectively between the posts on the opposite sides of said base, a mounting member arranged for sliding movement on each of said posts, said mounting member being connected with the ends of said post-carried bars to support them, jack means associated with each of said posts for shifting said mounting member vertically along the post, mechanism for simultaneously operating said jack means to raise and lower said bars and maintain them in the same horizontal plane, a pair of cross bars extending between and adjustable on said post-carried bars, a tool mounting arranged for adjusting movement on said cross bars, a second pair of post-carried bars arranged below the first mentioned pair, mounting members on the respective posts connected with said lower bars to support them, a work-table carried on said bars, a second jack means associated with each of said posts for shifting the lower mounting members along the posts, and a second mechanism for simultaneously operating said jack means to raise and lower the work-table with respect to said tool mounting.

JACK K. MOORE.

References Cited in the file of this patent
UNITED STATES PATENTS

| Number | Name | Date |
|---|---|---|
| 1,046,394 | Kolassa | Dec. 3, 1912 |
| 2,405,387 | Yeomans et al. | Aug. 6, 1946 |